(12) United States Patent
Konokawa

(10) Patent No.: US 10,275,125 B2
(45) Date of Patent: Apr. 30, 2019

(54) IMAGE DATA GENERATION APPARATUS AND NON-TRANSITORY COMPUTER-READABLE RECORDING MEDIUM

(71) Applicants: NHN Entertainment Corporation, Seongnam-shi, Gyeonggi-do (KR); NHN Comico Corporation, Tokyo (JP)

(72) Inventor: Yuki Konokawa, Tokyo (JP)

(73) Assignees: NHN COMICO CORPORATION, Tokyo (JP); NHN ENTERTAINMENT CORPORATION, Seongnam-shi, Gyeonggi-do (KR)

( * ) Notice: Subject to any disclaimer, the term of this patent is extended or adjusted under 35 U.S.C. 154(b) by 103 days.

(21) Appl. No.: 15/342,187

(22) Filed: Nov. 3, 2016

(65) Prior Publication Data
US 2017/0139563 A1 May 18, 2017

(30) Foreign Application Priority Data

Nov. 12, 2015 (JP) ................................. 2015-222282

(51) Int. Cl.
*G06F 17/21* (2006.01)
*G06F 3/0486* (2013.01)
(Continued)

(52) U.S. Cl.
CPC ........ *G06F 3/0483* (2013.01); *G06F 3/04845* (2013.01); *G06F 17/21* (2013.01); *G06F 3/04883* (2013.01)

(58) Field of Classification Search
None
See application file for complete search history.

(56) References Cited

U.S. PATENT DOCUMENTS 5,438,662 A * 8/1995 Randall ................. G06F 3/0483
715/205
6,046,743 A * 4/2000 Stenton ................. G06F 3/0483
715/776
(Continued)

FOREIGN PATENT DOCUMENTS

JP H10-105683 A 4/1998
JP 2000-194671 A 7/2000
(Continued)

OTHER PUBLICATIONS

"Smart comic and novel service [comico], the official photo editing application [comico PAGE] released today", web page, Sep. 18, 2015, http://www.nhn-comico.com/press/index.nhn?m=read&docid=8817230, NHN PlayArt Co., Ltd., Tokyo, Japan. With explanation pertaining to exception of lack of novelty of the invention and partial translation.
(Continued)

*Primary Examiner* — Yongjia Pan
(74) *Attorney, Agent, or Firm* — Hauptman Ham, LLP

(57) ABSTRACT

It is an object to easily edit data having a plurality of pages. A program according to this invention causes a computer to cause a display unit to display at least one page of a plurality of pages arranged in accordance with a predetermined layout and an interchanging operation image for changing the layout by interchanging the position of a first page included in the at least one page with the position of a second page in a mode of specifying the first page and the second page, change the layout so as to interchange the first page with the second page upon accepting an operation on the interchanging operation image, and obtain image data representing one image by arranging images on the plurality of pages in accordance with the layout and connecting the images.

8 Claims, 13 Drawing Sheets

(51) Int. Cl.
*G06F 3/0483* (2013.01)
*G06F 3/0484* (2013.01)
*G06F 3/12* (2006.01)
*G06F 17/20* (2006.01)
*G06F 3/0488* (2013.01)

(56) References Cited

U.S. PATENT DOCUMENTS

| | | | | |
|---|---|---|---|---|
| 7,629,984 | B2* | 12/2009 | Reid | G06T 11/60 345/611 |
| 7,689,933 | B1* | 3/2010 | Parsons | G06F 3/0482 715/200 |
| 8,139,256 | B2* | 3/2012 | Motamed | H04N 1/00384 358/1.1 |
| 8,185,842 | B2* | 5/2012 | Chang | G06F 3/04883 345/473 |
| 8,276,098 | B2* | 9/2012 | Fagans | G06F 3/04817 715/811 |
| 8,363,234 | B2* | 1/2013 | Morooka | G06F 17/248 358/1.13 |
| 8,782,557 | B2* | 7/2014 | Dernis | G06F 3/0482 715/790 |
| 8,799,829 | B2* | 8/2014 | Grosz | G06F 3/1242 709/219 |
| 8,861,005 | B2* | 10/2014 | Grosz | G06F 3/1242 358/1.1 |
| 8,862,986 | B2* | 10/2014 | Atkins | G06Q 50/10 715/243 |
| 9,026,932 | B1* | 5/2015 | Dixon | G06F 3/04883 715/702 |
| 9,383,957 | B2* | 7/2016 | Uhlig | G06F 17/212 |
| 9,633,047 | B2* | 4/2017 | McCurdy | G06F 17/30265 |
| 9,747,019 | B2* | 8/2017 | Yun | G06F 3/0488 |
| 9,778,733 | B2* | 10/2017 | Joo | G06F 3/00 |
| 9,785,307 | B1* | 10/2017 | Ganesan | G06F 3/0482 |
| 9,983,773 | B2* | 5/2018 | Ikeda | H04N 1/0044 |
| 2002/0114009 | A1* | 8/2002 | Stevens | H04N 1/32512 358/1.18 |
| 2004/0105123 | A1* | 6/2004 | Fritz | G06F 3/1205 358/1.16 |
| 2012/0166987 | A1* | 6/2012 | Kang | G06F 3/0483 715/765 |
| 2012/0284595 | A1* | 11/2012 | Lyons | G06F 17/211 715/202 |
| 2013/0298014 | A1* | 11/2013 | Kodimer | H04N 1/00411 715/251 |
| 2013/0326341 | A1 | 12/2013 | Nonaka | |
| 2014/0092424 | A1* | 4/2014 | Grosz | G06F 3/1242 358/1.15 |
| 2014/0109012 | A1* | 4/2014 | Choudhary | G06F 3/0483 715/838 |
| 2016/0054869 | A1* | 2/2016 | Sirpal | G06F 3/1438 715/761 |

FOREIGN PATENT DOCUMENTS

| | | |
|---|---|---|
| JP | 2005-038164 A | 2/2005 |
| JP | 2013-089198 A | 5/2013 |

OTHER PUBLICATIONS

"iTunes preview", web page, Sep. 18, 2015, https://itunes.apple.com/jp/app/comico-page/id1022207498?mt=8, Apple Inc., Cupertino, California. With explanation pertaining to exception of lack of novelty of the invention and partial translation.

"Comico PAGE Free manga-style photo decoration", web page, Sep. 28, 2015, https://play.google.com/store/apps/details?id=jp.comico.page, Google Inc., Mountain View, California. With explanation pertaining to exception of lack of novelty of the invention and partial translation.

"Get the feeling that I have already become comico writer comico official photo editing application [comico PAGE] release" web page, Sep. 18, 2015, http://ebook.itmedia.co.jp/ebook/articles/1509/18/news077.html, IT Media Co., Ltd, Tokyo, Japan. With explanation pertaining to exception of lack of novelty of the invention and partial translation.

"Release of the application [comico PAGE] which can process photos like a vertical scrolling manga." web page, Sep. 18, 2015, http://internet.watch.impress.co.jp/docs/news/20150918_721974.html, Impress Co., Ltd., Tokyo, Japan. With explanation pertaining to exception of lack of novelty of the invention and partial translation.

"Publication of editing application [comicoPAGE] from photos to comics? Writer's revenue is also supported", web page, Sep. 19, 2015, http://animeanime.jp/article/2015/09/19/24966.html, lid Co., Ltd., Tokyo, Japan. With explanation pertaining to exception of lack of novelty of the invention and partial translation.

* cited by examiner

IMAGE DATA GENERATION APPARATUS AND NON-TRANSITORY COMPUTER-READABLE RECORDING MEDIUM

CROSS-REFERENCE TO RELATED APPLICATIONS

This application is based upon and claims the benefit of priority from the prior Japanese Patent Application No. 2015-222282, filed on Nov. 12, 2015, the entire contents of which are incorporated herein by reference.

FIELD

The present invention relates to a technique of editing data having a plurality of pages.

BACKGROUND

When creating a book containing many images such as cartoons, it is necessary to use a technique different from a technique of creating a book containing many characters. For this reason, techniques of supporting the creation of cartoons have been developed (for example, Japanese Patent Laid-Open Nos. 2013-089198, 2000-194671, H10-105683, and 2005-038164). These techniques include techniques effective in creating electronic books.

When cartoon books as general books are to be sold in the form of electronic books, some books are converted into electronic books without changing the layout of the contents of the cartoon books. In such a case, however, some books are very difficult to read depending on the situation in which they are browsed. When browsing electronic books, for example, general users often use portable devices such as smartphones. Such portable devices have smaller display sizes than personal computers. For this reason, electronic books displayed on the displays of portable devices are sometimes difficult to read because of characters being too small.

Under the circumstances, various contrivances have been studied to facilitate browsing. For example, the size of one page may be reduced to make it correspond to the area that can be displayed on a display. In such a case, the number of pages increases. As a result, a technique is required which supports the creation of an electronic book containing many pages containing images.

SUMMARY

According to an embodiment of the present invention, there is provided an image data generation apparatus comprising a display device, an operation device configured to output an operation signal corresponding to an operation from a user with respect to an image displayed on the display device, a storage device configured to store a layout of a plurality of pages, and a controller configured to cause the display device to display at least one page of the plurality of pages arranged in accordance with the layout stored in the storage device, the controller causing an interchanging operation image for changing the layout by interchanging a position of a first page included in the at least one page with a position of a second page to be displayed in a mode of specifying the first page and the second page, changing the layout stored in the storage device so as to interchange the first page with the second page when the operation device outputs the operation signal indicating that an operation on the interchanging operation image is accepted, and obtaining one image by arranging images on the plurality of pages in accordance with the layout and connecting the images to generate image data representing the one image.

The controller may change the layout stored in the storage device so as to display the second page at a position at which the first page has been displayed.

The second page is adjacent to the first page, the interchanging operation image is displayed on a second page side than a middle line of the first page, and the second page is specified in accordance with the interchanging operation image.

The layout of the plurality of pages may comprise a layout in which the pages are one-dimensionally arranged.

The layout of the plurality of pages may comprise a layout in which the pages are two-dimensionally arranged.

The controller may cause the display device to display a deleting operation image for deleting the first page in a mode of specifying the first page.

The controller may further generate image data representing an image on each of the plurality of pages.

The controller may cause the above computer to function to specify an editing target page from pages displayed on the display device based on the operation signal and execute an editing process for the editing target page.

The controller may execute an editing process of obtaining a template for defining an area in which an image represented by image data is configured to be arranged on the page and causing designated image data to be displayed inside the area, based on the operation signal.

In addition, according to an embodiment of the present invention, there is provided an image data generation apparatus comprising a display control unit configured to display, on a display device, at least one page of a plurality of pages arranged in accordance with a layout stored in a storage device and cause the display device to display an interchanging operation image for changing the layout by interchanging a position of a first page included in the at least one page with a position of a second page in a mode of specifying the first page and the second page, a layout changing unit configured to change the layout so as to interchange the first page with the second page upon obtaining the operation signal indicating that an operation on the interchanging operation image is accepted, and an image generation unit configured to obtain one image by arranging images on the plurality of pages in accordance with the layout and connecting the images to generate image data representing the one image.

Furthermore, according to an embodiment of the present invention, there is provided a non-transitory computer-readable recording medium storing a program for causing a computer to execute displaying, on a display device, at least one page of a plurality of pages arranged in accordance with a layout stored in a storage device and causing the display device to display an interchanging operation image for changing the layout by interchanging a position of a first page included in the at least one page with a position of a second page in a mode of specifying the first page and the second page, changing the layout stored in the storage device so as to interchange the first page with the second page upon obtaining an operation signal indicating that an operation on the interchanging operation image is accepted, and obtaining one image by arranging images on the plurality of pages in accordance with the layout and connecting the images to generate image data representing the one image.

DESCRIPTION OF EMBODIMENTS

Figure 1:
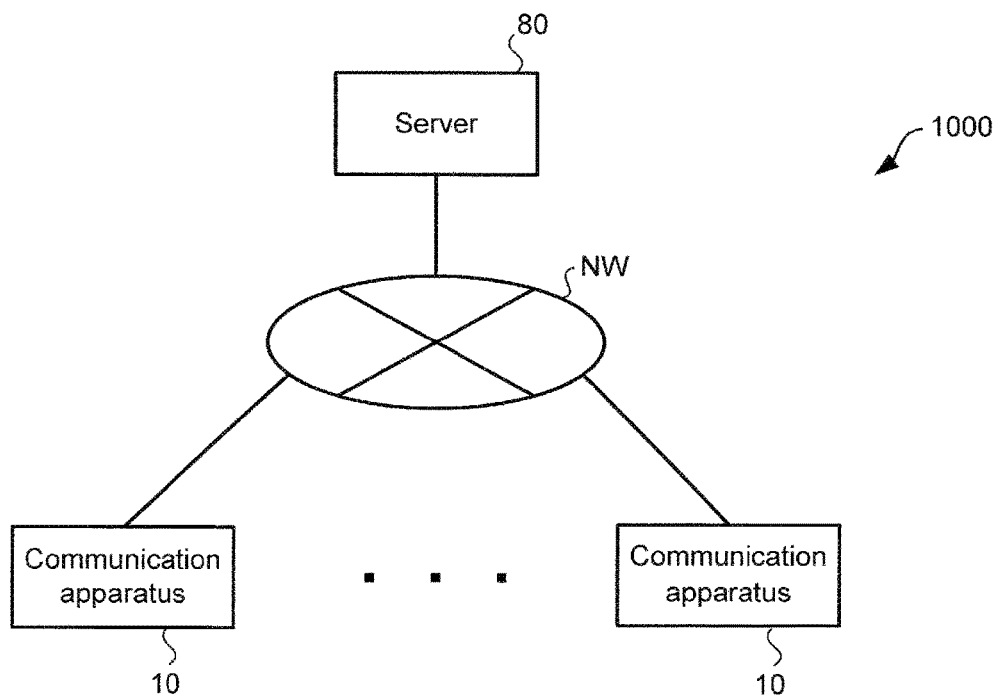
FIG. 1 is a block diagram showing the arrangement of a communication system according to the first embodiment of the present invention.

A communication system according to an embodiment of the present invention will be described in detail below with reference to the accompanying drawings. The following embodiments are examples the embodiments of the present invention, and the present invention is not limited to them. Note that the same reference numerals or similar reference numerals (only with suffixes such as "A" and "B") denote the same parts or parts having similar functions in the drawings to be referred to in the embodiments, and a repetitive description will sometimes be omitted.

First Embodiment

A communication system according to the first embodiment of the present invention will be described in detail with reference to the accompanying drawings.
[Outline]

FIG. 1 is a block diagram showing the arrangement of a communication system according to the first embodiment of the present invention. A communication system 1000 includes a communication apparatus 10 and a server 80. The communication apparatus 10 and the server 80 are connected to a network NW such as the Internet or a communication line. The communication apparatus 10 according to the first embodiment is a smartphone. In this embodiment, the communication apparatus 10 is an apparatus which can communicate with other apparatuses via the network NW.

FIG. 1 shows the server 80 as a single apparatus but may be constituted by a plurality of apparatuses. The server 80 provides application programs to the communication apparatus 10 and provides various types of services. Such application programs are recorded on a recording medium (storage device) included in the server 80 or a recording medium which can be read by the server 80. Various types of services may include, for example, SNS (Social Networking Service).

An application program (to be simply referred to as a program hereinafter) for the creation of electronic books such as cartoon books is installed in the communication apparatus 10. This program makes it possible to facilitate creating a cartoon segmented input portions on a plurality of pages. In this case, the program makes it possible to perform an editing process such as a page-specific processing and page layout changing and to create a cartoon by generating image data (to be referred to as continuous image data hereinafter) representing an image (to be referred to as a continuous image hereinafter) obtained by combining a plurality of pages into one. In this manner, this program allows the communication apparatus 10 to also function as an image data generation apparatus. The arrangement of the communication apparatus 10 and the editing function implemented by the communication apparatus 10 will be described below.

[Hardware Arrangement of Communication Apparatus 10]

Figure 2:
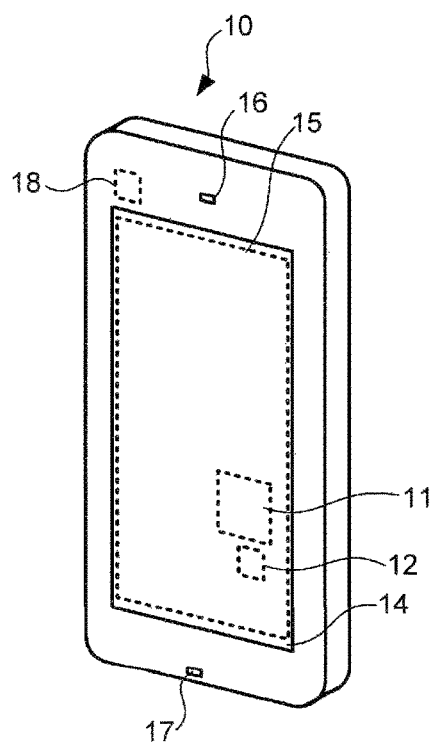
FIG. 2 is a schematic view showing the outer appearance of a communication apparatus according to the first embodiment of the present invention.

FIG. 2 is a schematic view showing the outer appearance of the communication apparatus according to the first embodiment of the present invention. The communication apparatus 10 is provided with a control unit 11, a storage unit 12, a display unit 14, a touch sensor 15, a speaker 16, a microphone 17, and a communication module 18. The display unit 14 and the touch sensor 15 provided on the surface of the display unit 14 constitute a touch panel. Note that the communication apparatus 10 may be provided with different components such as an acceleration sensor, an operation button, a headphone terminal, and a memory card slot.

The control unit 11 includes an arithmetic processing circuit (controller) such as a CPU and a storage device such as a RAM. The control unit 11 causes the CPU to execute programs stored in the storage unit 12 so as to make the communication apparatus 10 implement various types of functions. The implemented functions use signals and the like output from the respective components of the communication apparatus 10. The functions implemented by executing programs include an editing function (to be described later).

These programs may be downloaded from the server 80 via the network NW as described above or may be installed in the storage unit 12 in advance. Note that the programs may be provided while being stored in a computer-readable recording medium such as a magnetic recording medium, optical recording medium, magneto-optical recording medium, or semiconductor memory. In this case, the communication apparatus 10 may be a computer including an apparatus which reads a recording medium. The storage unit 12 can be an example of a recording medium.

The display unit 14 is a display device such as a liquid crystal display or organic EL display. The display unit 14 displays various types of screens (including a page editing screen and layout editing screen (to be described later)) under the control of the control unit 11. The touch sensor 15 is an operation device which accepts a user's operation and outputs an operation signal corresponding to the operation to the control unit 11. The user performs an operation by, for example, touching a portion corresponding to the position of an operation image (an icon or the like) displayed on the display unit 14 with his/her finger, stylus pen, or the like. In the following description, the operation of touching a portion corresponding to the position of an operation image in this manner is sometimes expressed as "operating an operation image".

The speaker 16 outputs sounds under the control of the control unit 11. The microphone 17 converts an input sound into an electrical signal and outputs it to the control unit 11. The communication module 18 is connected to the network NW to transmit/receive information to/from another apparatus such as the server 80 connected to the network NW under the control of the control unit 11.

[Editing Function]

The editing function implemented by causing the control unit 11 of the communication apparatus 10 to execute a program will be described. Part or all of the arrangement which implements the editing function (to be described below) may be implemented by hardware or an external apparatus such as the server 80. When part of the arrangement is implemented by an external apparatus, a system of cooperation between the external apparatus and the communication apparatus 10 implements the following editing function.

Figure 3:
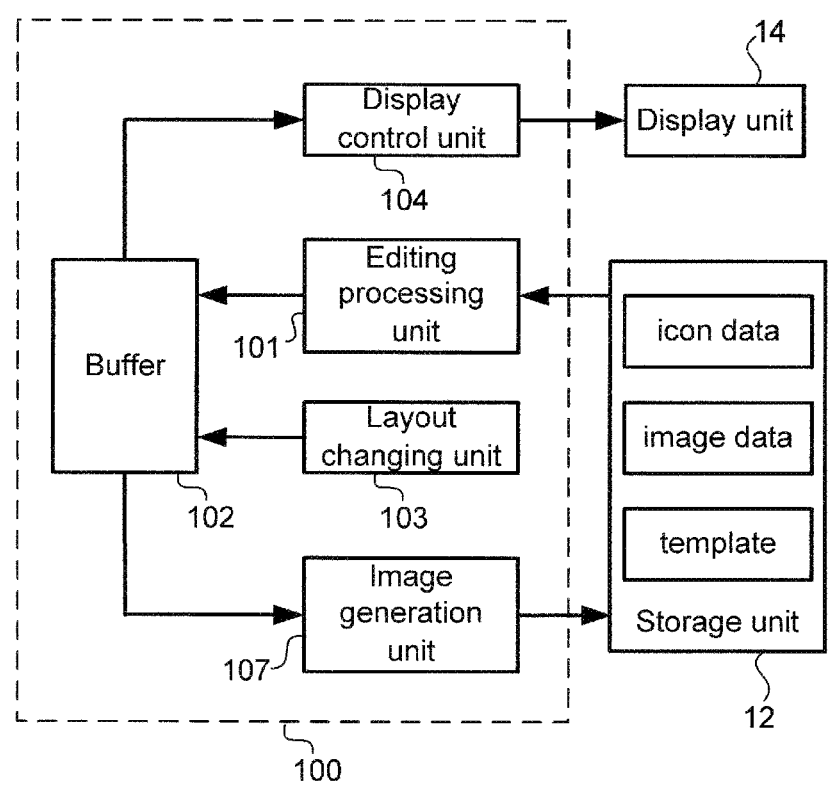
FIG. 3 is a block diagram showing an editing function implemented by the communication apparatus according to the first embodiment of the present invention.

FIG. 3 is a block diagram showing the editing function implemented by the communication apparatus according to the first embodiment of the present invention. An editing function 100 is implemented by an editing processing unit 101, a buffer 102, a layout changing unit 103, a display control unit 104, and an image generation unit 107.

The buffer 102 is an area for storing the data of cartoons to be created by the user on a page basis. This area is provided in, for example, the storage device. Information to be stored (to be referred to as buffer data hereinafter) includes a layout indicating an order in which a plurality of pages are arranged (to be referred to as a page layout hereinafter) and the contents of each page (the contents, the positions, sizes, and rotational angels of the images, and the like). In this case, a plurality of pages are defined by a layout in which the pages are vertically aligned. For example, a layout in which four pages (PA, PB, PC, and PD) are vertically aligned is defined by buffer data PSD1 (see FIG. 4). In the following description, a plurality of pages defined by buffer data as a whole are sometimes referred to as a page set.

The display control unit 104 causes the display unit 14 to display at least part of a page set represented by buffer data in the buffer 102. At this time, the display control unit 104 decides the type of screen on which a page is to be displayed, based on a user's operation. In this case, the types of screens to be displayed include a layout editing screen (see FIG. 6), a page editing screen (see FIG. 8), and a continuous image display screen (see FIG. 9). The layout editing screen is a screen for changing a page layout by changing the order of pages or deleting pages. The page editing screen is a screen for editing the contents of one page. The continuous image display screen is a screen for displaying a generated continuous image. The details of each of these screens will be described later.

The layout changing unit 103 specifies the change contents of a page layout based on a user's operation and changes data concerning the page layout of the buffer data stored in the buffer 102. The layout changing unit 103 can specify a user's operation by obtaining an operation signal. Page layout changing includes a page interchanging process, a page deletion process, and a page addition process.

Figure 4:
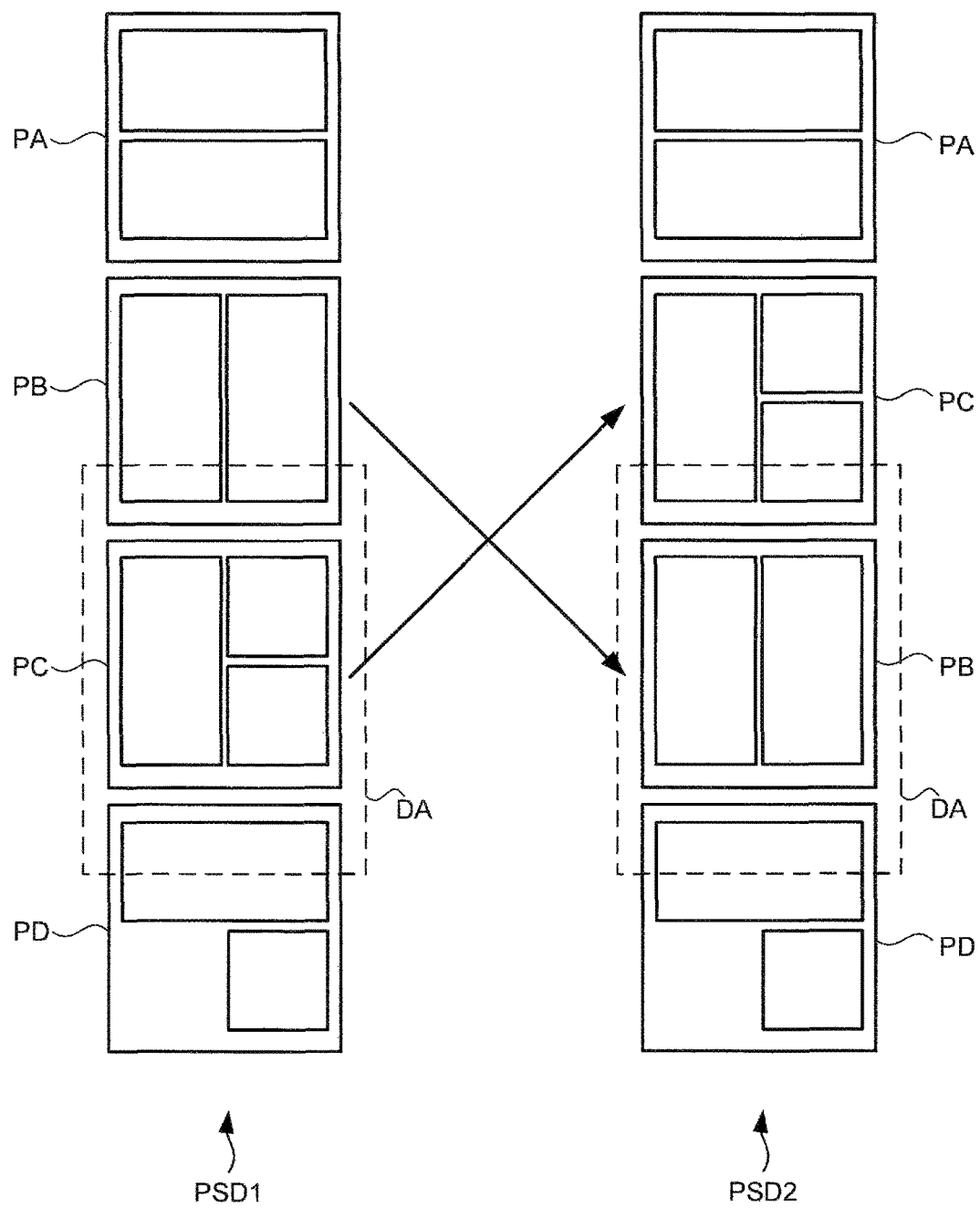
FIG. 4 is a view for explaining a page layout changing process (interchanging process) according to the first embodiment of the present invention.

FIG. 4 is a view for explaining a page layout changing process (interchanging process) according to the first embodiment of the present invention. When, for example, the user performs an operation for interchanging a page PB with a page PC in the page layout of the buffer data PSD1, the layout changing unit 103 changes the buffer data into buffer data PSD2 in which the position of the page PB is interchanged with that of the page PC.

Figure 5:
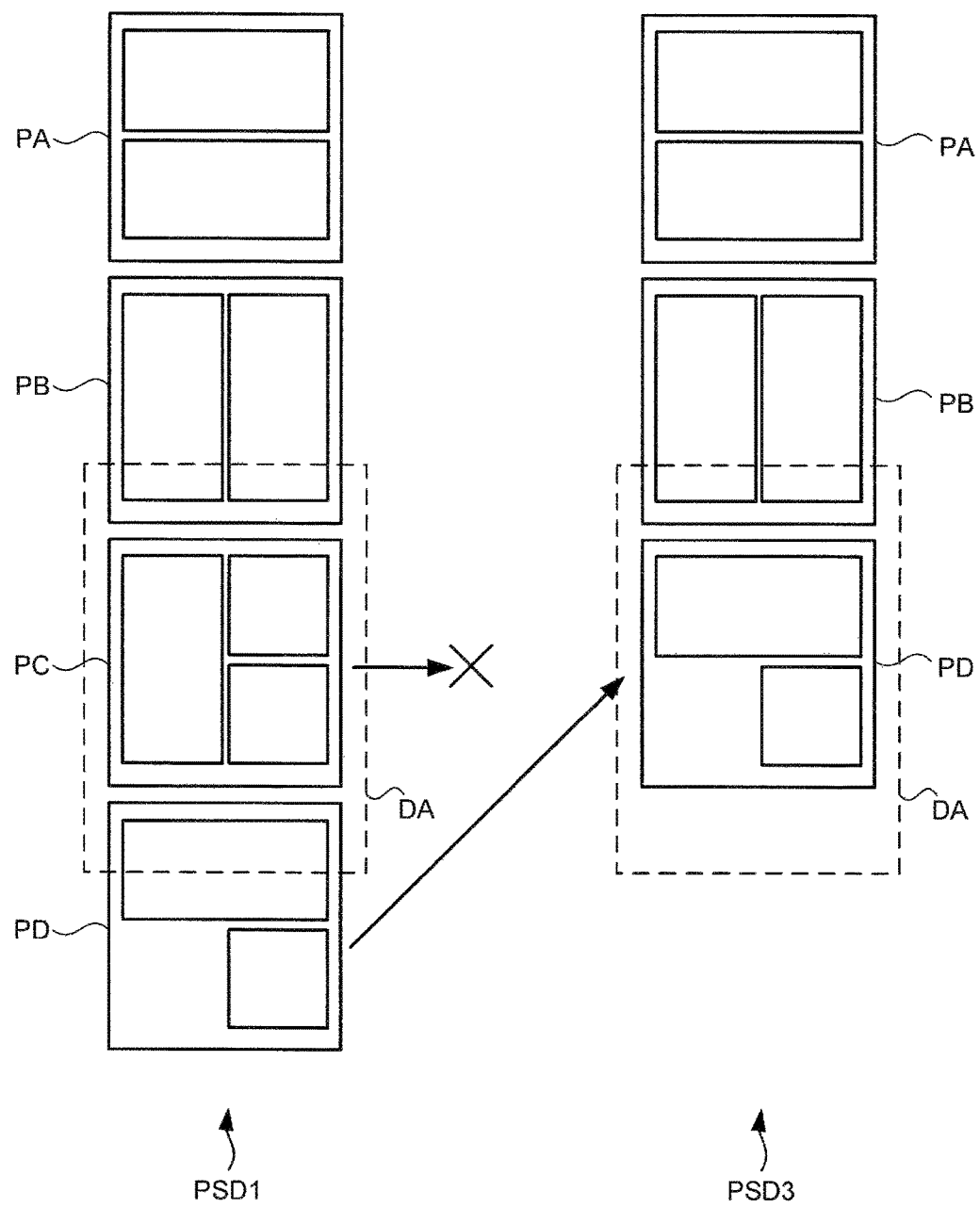
FIG. 5 is a view for explaining a page layout changing process (deletion process) according to the first embodiment of the present invention.

FIG. 5 is a view for explaining a page layout changing process (deletion process) according to the first embodiment of the present invention. When, for example, the user performs an operation for deleting the page PC in the page layout of the buffer data PSD1, the layout changing unit 103 deletes the page PC to change the buffer data into buffer data PSD3 in which a page PD which has existed immediately behind the page PC is moved to the position of the page PC.

Figure 6:
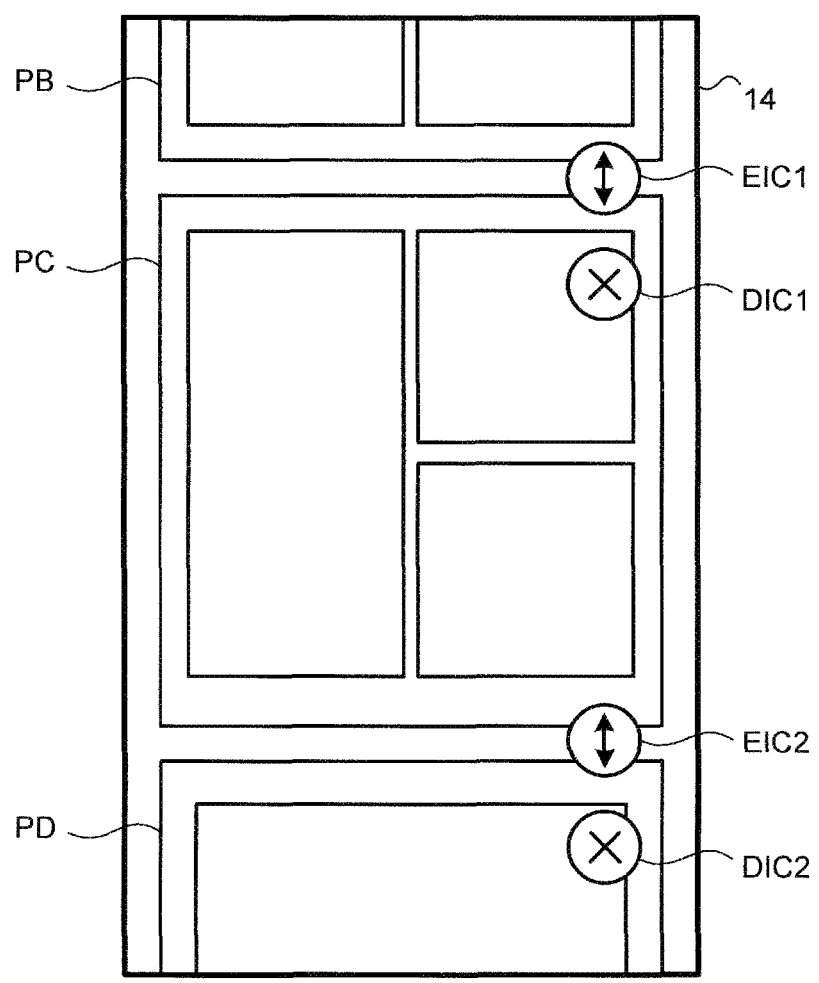
FIG. 6 is a view showing a display example of a layout editing screen according to the first embodiment of the present invention.

FIG. 6 is a view showing a display example of the layout editing screen according to the first embodiment of the present invention. FIG. 6 shows an example of displaying, on the display unit 14, a portion of the buffer data PSD1 in FIGS. 4 and 5 which corresponds to a display area DA. The user can change the range of a page displayed on the display unit 14 by changing the position of the display area DA by scrolling.

The layout editing screen displayed on the display unit 14 displays interchanging operation images EIC1 and EIC2 and deleting operation images DIC1 and DIC2. The interchanging operation images EIC1 and EIC2 each are displayed between adjacent pages. For example, the interchanging operation image EIC1 is displayed between the page PB and the page PC. The deleting operation images DIC1 and DIC2 are displayed in correspondence with the respective pages.

When the user operates the interchanging operation image EIC1, the page layout is changed so as to interchange the page PB and the page PC, as shown in FIG. 4. When the user operates the interchanging operation image EIC2, the page layout is changed so as to interchange the page PC and the page PD. That is, when the user operates an interchanging operation image, pages located on both the sides of the display position of the interchanging operation image are interchanged. In other words, the display position of an interchanging operation image is displayed in a mode of specifying two pages to be interchanged.

Note that in this case, the interchanging operation image EIC1 for interchanging the page PB and the page PC is displayed between the page PB and the page PC. However, the interchanging operation image may be displayed at another position. For example, the interchanging operation image EIC1 may be displayed on a page PB side than a middle line of the page PC to specify the page PB and the page PC as interchanging target pages. At this time, the interchanging operation image EIC1 may be displayed at a position superimposed on the page PC or a position superimposed on the page PB.

In addition, the page PB and the page PC may be specified as interchanging target pages by an image of the interchanging operation image EIC1. For example, the interchanging operation image EIC1 may include characters for specifying interchanging target pages or may have a shape for specifying them.

When the user operates the deleting operation image DIC1, the page layout is changed so as to delete the page PC, as shown in FIG. 5. When the user operates the deleting operation image DIC2, the page layout is changed so as to delete the page PD. That is, when the user operates a deleting operation image, a page at a position at which the deleting operation image is displayed is deleted. In other words, the display position of a deleting operation image is displayed in a mode of specifying a page to be deleted.

Figure 7:
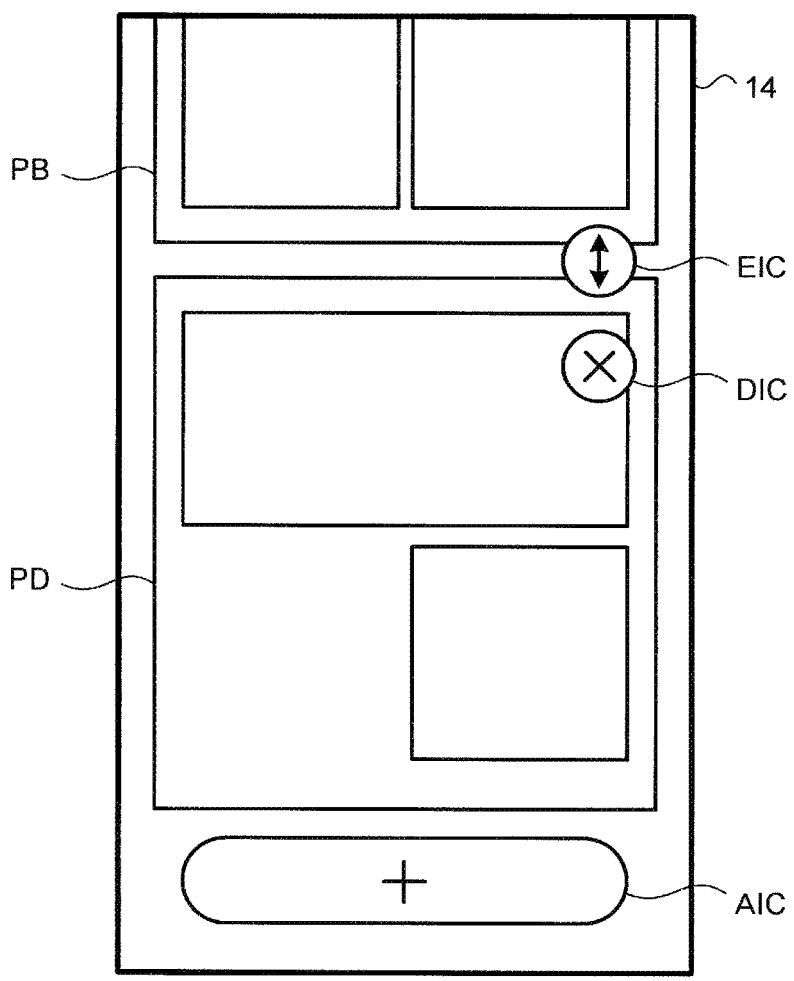
FIG. 7 is a view showing an example of displaying a page end portion on the layout editing screen according to the first embodiment of the present invention.

FIG. 7 is a view showing an example of displaying a page end portion on the layout editing screen according to the first embodiment of the present invention. The display example shown in FIG. 7 corresponds to a case in which the display area DA displays the lower end of the last page PD in the buffer data PSD3 shown in FIG. 5. In this case, an adding operation image AIC is displayed on the lower side of the page PD (on the side where no adjacent page exists). When the user operates the adding operation image AIC, a new page is created on the lower side of the page PD. Note that the adding operation image AIC may be displayed on the upper side of a first page PA (on the side where no adjacent page exists).

Referring back to FIG. 3, the editing processing unit 101 specifies one page as an editing target based on a user's operation, and changes data concerning the contents of the editing target page of the buffer data stored in the buffer 102. When the user performs the operation of specifying one of the pages on the layout editing screen (for example, the operation of touching a portion of the page with his/her finger), the specified page is decided as an editing target.

Figure 8:
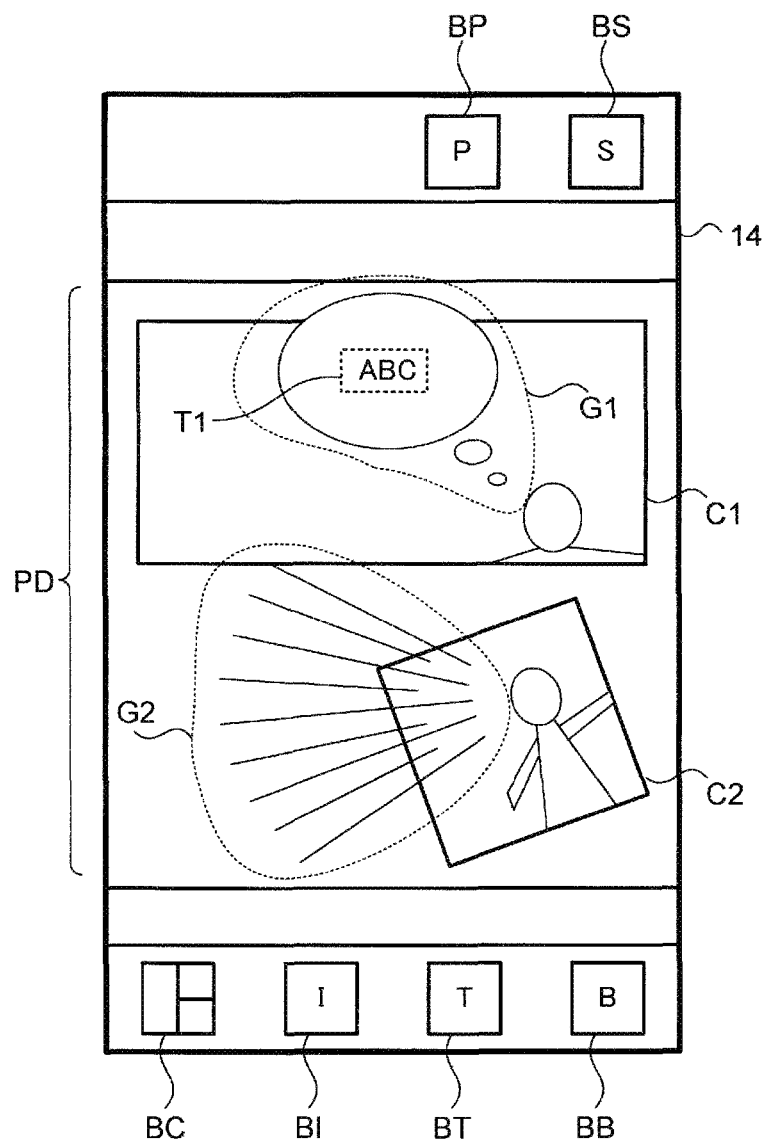
FIG. 8 is a view showing a display example of a page editing screen according to the first embodiment of the present invention.

FIG. 8 is a view showing a display example of the page editing screen according to the first embodiment of the present invention. FIG. 8 shows a display example of the page editing screen when the page PD is specified as an editing target. In this case, the page PD as an editing target is displayed in a size larger than that on the layout editing screen. Note that the display example shown in FIG. 8 shows a progressed state of editing. Each operation image will be described below, together with the contents of an editing process accompanying an operation on each operation image, with reference to FIG. 8.

In this case, the page editing screen shown on the display unit 14 displays a plurality of types of operation images. In the case, the plurality of types of operation images include a save operation image BS, a layout changing operation image BP, an area designating operation image BC, an image adding operation image BI, a text adding operation image BT, and a background designating operation image BB.

The area designating operation image BC is an operation image for selecting an area (frame) in which image data can be displayed on an editing target page (to be referred to as the page PD hereinafter in correspondence with the illustration in FIG. 8). In the case shown in FIG. 8, frames correspond to areas C1 and C2. As frame arrangements (to be referred to as frame layouts hereinafter), various patterns are stored as templates in the storage unit 12. Each page shown in FIG. 4 exemplarily shows a frame layout pattern. In such a frame area, an image represented by image data stored in the storage unit 12 can be arranged. This image is trimmed in accordance with the shape of the frame. The frame can be changed in size and rotated. An image to be trimmed in accordance with the shape of a frame can also be changed in size and rotated. In the case shown in FIG. 8, the frame area C2 has undergone a rotation process.

The image adding operation image BI is an operation image for displaying an icon image on the page PD regardless of a frame. In the case shown in FIG. 8, icon images are images represented by icon data stored in the storage unit 12, and correspond to images G1 and G2. The icon images are arranged on a layer higher than the images trimmed in accordance with the shapes of the frames. The hierarchical relationship between the layers to which icon images belong can be changed by a user's operation. The text adding operation image BT is an operation image for displaying a character image on the page PD. In the case shown in FIG. 8, a character image corresponds to a text image T1. This image is treated in almost the same manner as the above icon image. The background designating operation image BB is an operation image for displaying an image belonging to the lowest layer on the page PD.

The layout changing operation image BP is an operation screen for finishing an editing process on the page editing screen and switching to the layout editing screen. The save operation image BS is an operation image for finishing an editing process on the page editing screen and issuing an instruction to generate image data corresponding to a page set represented by butter data stored in the buffer 102. In this case, the process further shifts from the page editing screen to the continuous image display screen.

Referring back to FIG. 3, the image generation unit 107 generates the image data of a page set represented by buffer data stored in the buffer 102 based on a user's operation. In this case, the image generation unit 107 generates individual image data and continuous image data and saves them in the storage unit 12.

Individual image data is data representing an image on each of a plurality of pages constituting a page set. As described above, continuous image data is data representing a continuous image. A continuous image is an image obtained by arranging images corresponding to the respective pages represented by individual image data in accordance with a page layout and connecting the images to each other. Individual image data and continuous image data are data recorded in, for example, a format such as jpg, gif, png, or bmp. In this manner, individual image data and continuous image data saved in the storage unit 12 can also be displayed in trimmed states corresponding to the shapes of frames in the above frame areas. Note that the image generation unit 107 may generate only either individual image data or continuous image data.

In addition, when image data are generated in this manner, buffer data stored in the buffer 102 may also be saved in the storage unit 12. Using such data makes it possible to continuously perform editing again.

Figure 9:
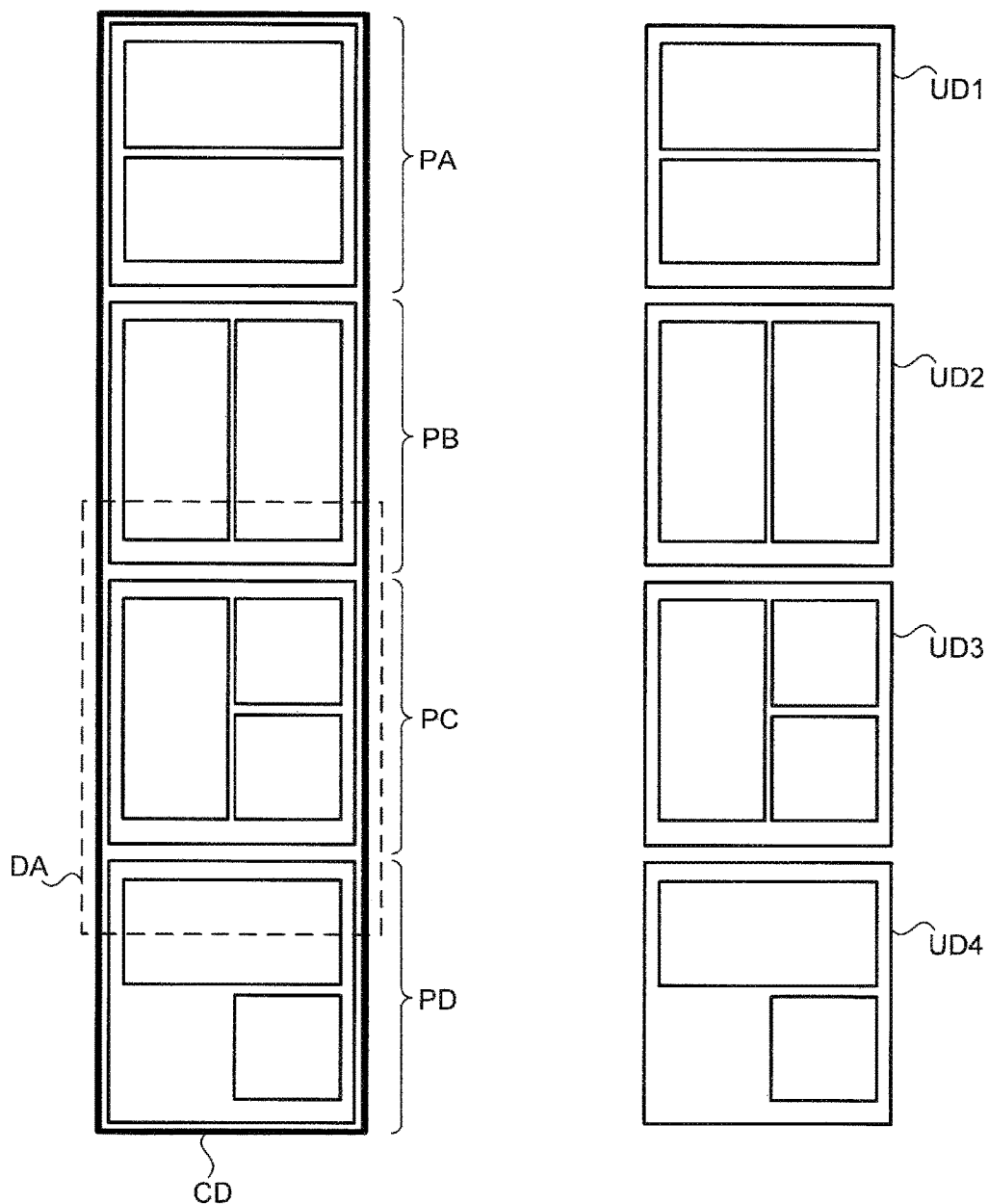
FIG. 9 is a view for explaining continuous image data and individual image data according to the first embodiment of the present invention.

FIG. 9 is a view for explaining continuous image data and individual image data according to the first embodiment of the present invention. As described above, individual image data UD1, UD2, UD3, and UD4 are data used to record images indicating the pages PA, PB, PC, and PD. Continuous image data CD is data used to record an image obtained by arranging the pages PA, PB, PC, and PD in a page layout and connecting them to each other. That is, the continuous image data CD is data used to record the individual image data UD1, UD2, UD3, and UD4 as one image upon arranging them in a page layout and connecting them to each other.

Figure 10:
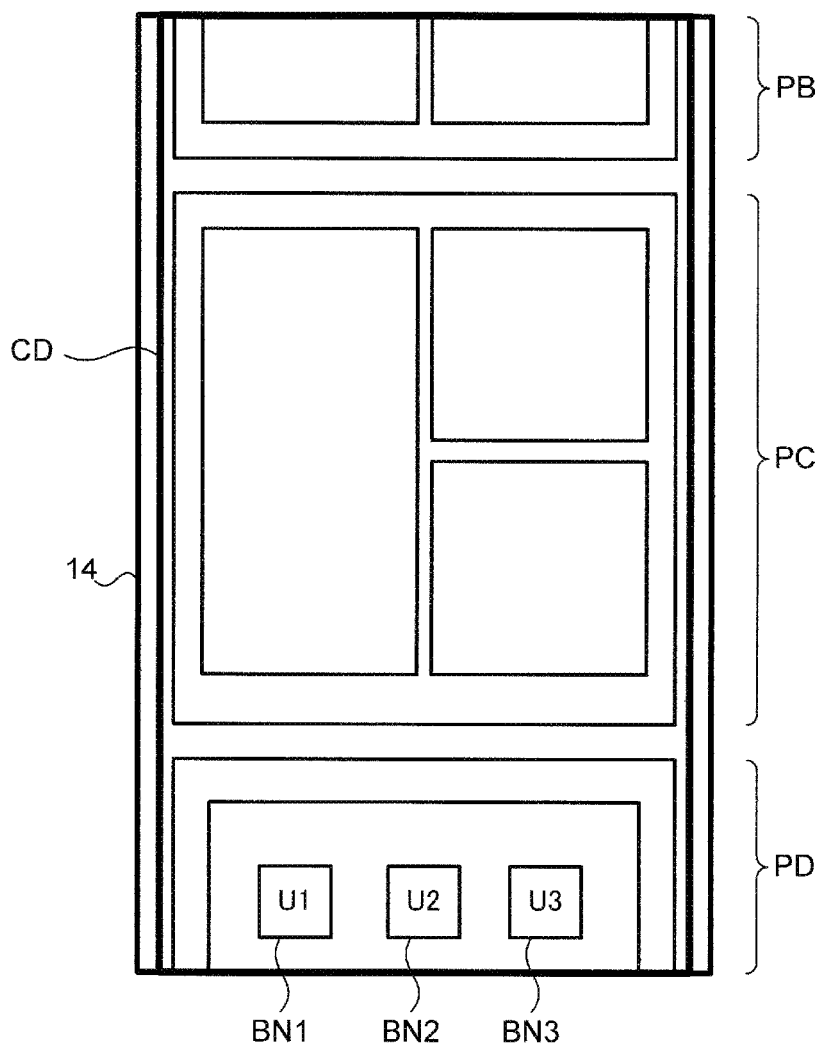
FIG. 10 is a view showing a display example of a continuous image display screen according to the first embodiment of the present invention.

FIG. 10 is a view showing a display example of the continuous image display screen according to the first embodiment of the present invention. As described above, when the user operates the save operation image BS on the page editing screen shown in FIG. 8, the screen shifts to the continuous image display screen. In this case, of a continuous image represented by continuous image data, a portion corresponding to the display area DA shown in FIG. 9 is displayed on the display unit 14. The user can change the range of a continuous image displayed on the display unit 14 by changing the position of the display area DA by scrolling.

In addition, in this case, operation images BN1, BN2, and BN3 for uploading are displayed on the continuous image display screen. When the user operates each operation image for uploading, continuous image data is uploaded to a server associated with the operation image. A server as an uploading destination is, for example, a server which provides storage services or a server which provides SNS. When uploading data to the server which provides SNS, it is possible to display a continuous image on, for example, the time line of a user registered in advance or further display text data on it.

[Operation of Editing Function 100]

Processing procedures executed by the editing function 100 described above will be described next with reference to the flowcharts shown in FIGS. 11 and 12.

Figure 11:
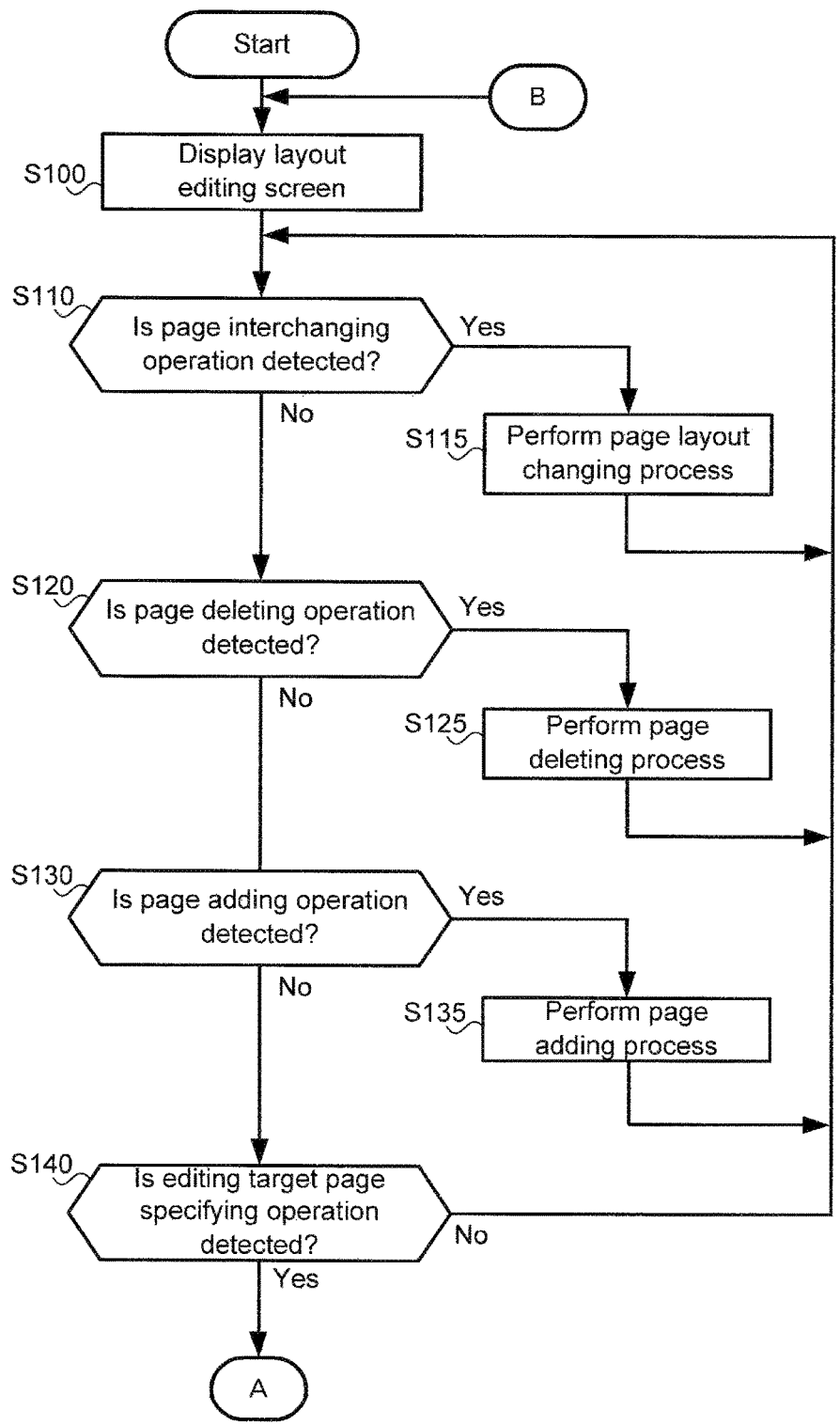
FIG. 11 is a flowchart showing processing executed by the editing function according to the first embodiment of the present invention.
Figure 12:
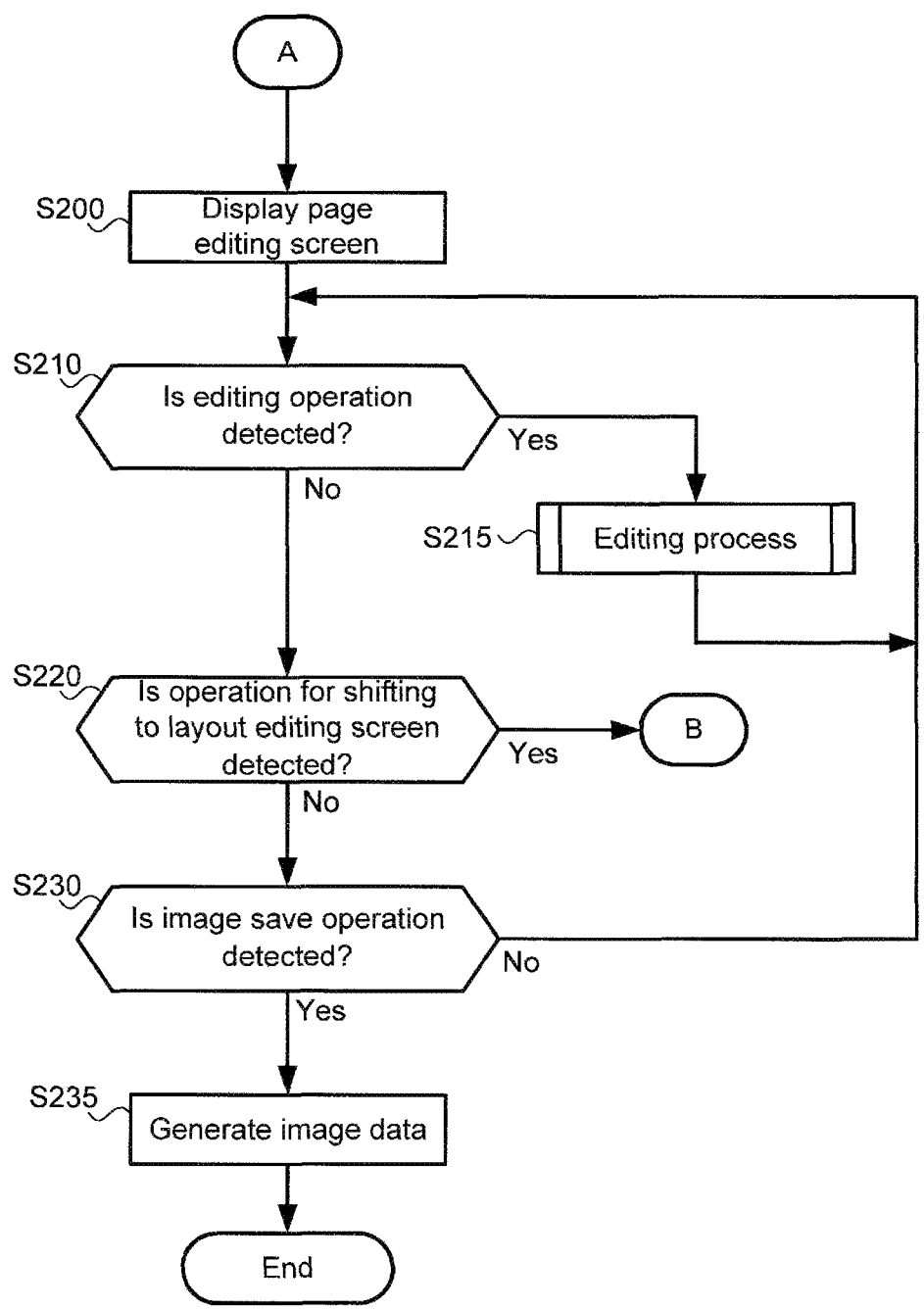
FIG. 12 is a flowchart showing processing executed by the editing function according to the first embodiment of the present invention.

FIGS. 11 and 12 are flowcharts showing processing to be executed by the editing function according to the first embodiment of the present invention. This processing starts when the control unit 11 implements the editing function 100. First of all, the control unit 11 causes the display unit 14 to display the layout editing screen (step S100). In this state, the control unit 11 is set in a first standby state for waiting for the detection of a page interchanging operation (an operation on an interchanging operation image), a page deleting operation (an operation on a deleting operation image), a page adding operation (an operation on an adding operation image), or an editing target page specifying operation (a page specifying operation) (NO in step S110; NO in step S120; NO in step S130; NO in step S140).

If a page interchanging operation is detected (YES in step S110), the control unit 11 performs a page layout changing process (interchanging process) (step S115). If a page deleting operation is detected (YES in step S120), the control unit 11 performs a page deletion process (step S125). If a page adding operation is detected (YES in step S130), the control unit 11 performs a page addition process (step S135). As described above, these processes are those executed by the layout changing unit 103. If any of these processes is performed, the control unit 11 is set in the first standby state again (NO in step S110; NO in step S120; NO in step S130; NO in step S140).

If an editing target page specifying operation is detected (YES in step S140), the layout editing screen switches to the page editing screen (step S200). In this state, the control unit 11 is set in a second standby state for waiting for the detection of an editing operation (an operation on, for example, the operation image BC, CI, CT, or BB), an operation for shifting to the layout editing screen (an operation on the layout changing operation image BP), or an image save operation (an operation on the save operation image BS) (NO in step S210; NO in step S220; NO in step S230).

If an editing operation is detected (YES in step S210), the control unit 11 performs an editing process (step S215). As described above, this editing process is a process executed by the editing processing unit 101. When the communication apparatus 10 performs the editing process, the control unit 11 is set in the second standby state again (NO in step S210; NO in step S220; NO in step S230).

If an operation for shifting to the layout editing screen is detected (YES in step S220), the display switches from the page editing screen to the layout editing screen (step S100). The control unit 11 is set in the first standby state again (NO in step S110; NO in step S120; NO in step S130; NO in step S140). If an image save operation is detected (YES in step S230), the control unit 11 generates image data (step S235), and switches from the page editing screen to the continuous image display screen. The control unit 11 then finishes the processing by the editing function 100. An image data generation process is a process executed by the image generation unit 107, as described above. That is, the image generation unit 107 generates continuous image data and individual image data and saves them in the storage unit 12. The operation described above is that of the editing function 100.

As has been described above, the editing function 100 according to this embodiment generates image data (continuous image data) representing an image in a state in which a plurality of pages are laid out. At this time, it is possible to edit one image for each page segmented for each predetermined range instead of editing one image as a whole as an editing target. It is also possible to interchange images on a page basis by a simple operation, that is, operating an interchanging operation image. This makes it possible to facilitate adjusting an image as a whole and perform an efficient editing operation while editing a partial area of the image and interchanging it with another partial area.

Second Embodiment

In the first embodiment, a page layout is defined such that pages are one-dimensionally aligned in the vertical direction. However, a page layout may be defined such that pages are aligned in the horizontal direction or two-dimensionally arranged. The second embodiment will exemplify a case in which a page layout is defined such that pages are two-dimensionally arranged.

Figure 13:
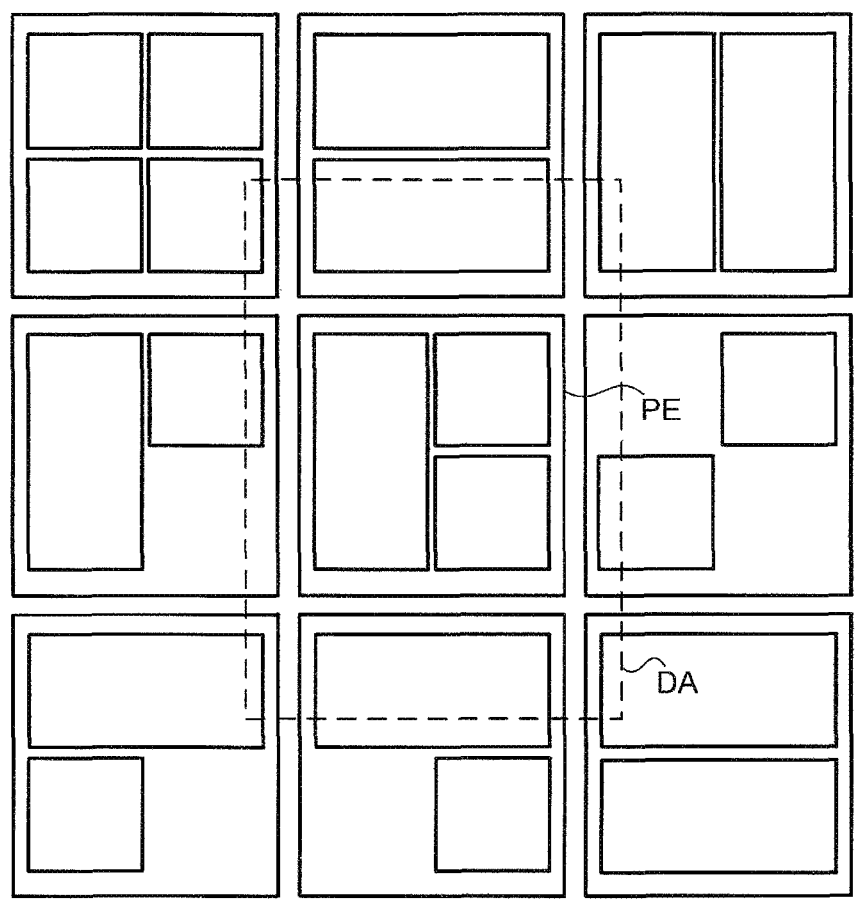
FIG. 13 is a view showing an example of a page layout according to the second embodiment of the present invention.

FIG. 13 is a view showing an example of a page layout according to the second embodiment of the present invention. As shown in FIG. 13, a page layout is a layout in which a plurality of pages are two-dimensionally arranged in the x and y directions. Therefore, a buffer 102 stores buffer data PSD4 of a two-dimensional page layout.

Figure 14:
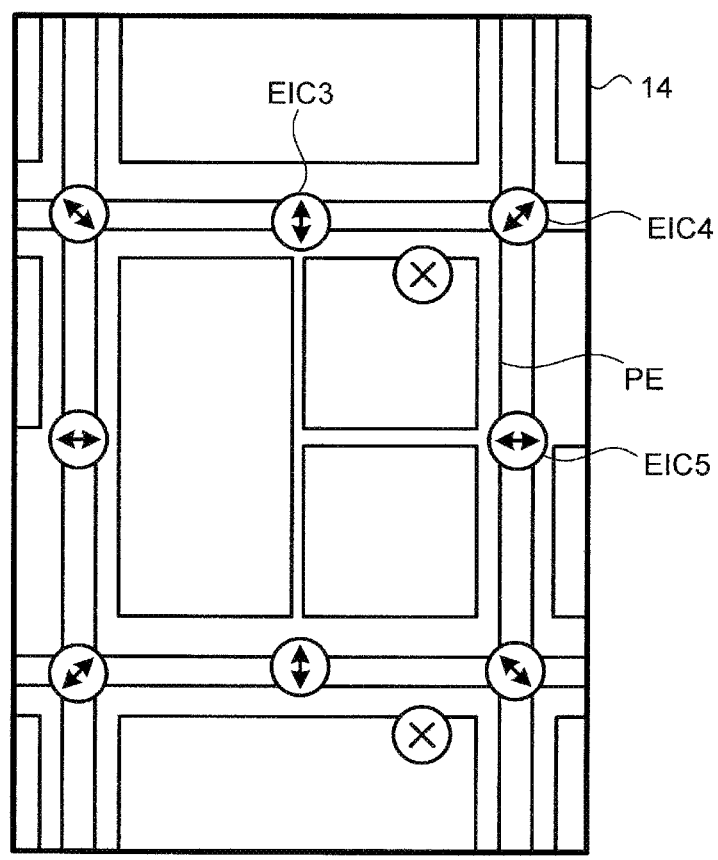
FIG. 14 is a view showing a display example of a layout editing screen according to the second embodiment of the present invention.

FIG. 14 is a view showing a display example of a layout editing screen according to the second embodiment of the present invention. FIG. 14 is a view showing an example of displaying, on a display unit 14, part of a display area DA of the buffer data PSD4 in FIG. 13. The user can change the range of a page displayed on the display unit 14 by changing the position of the display area DA by scrolling.

Like the layout editing screen described with reference to FIG. 6 in the first embodiment, the layout editing screen shown in FIG. 14 displays interchanging operation images between adjacent pages and deleting operation images in correspondence with the respective pages. When the position of a page PE is to be interchanged with that of an upper page, an interchanging operation image EIC3 may be operated. When the position of the page PE is to be interchanged with that of the right page, an interchanging operation image EIC5 may be operated. When the position of the page PE is to be interchanged with that of the upper right page, an interchanging operation image EIC4 may be operated.

Other Embodiments

The apparatus which implements the editing function 100 described above has been described as the communication apparatus 10. However, this apparatus need not always include a communication function. That is, it suffices if the apparatus is an information processing apparatus including a control unit which can implement the editing function 100. Note that the communication apparatus 10 according to the above embodiment is an example of the information processing apparatus.

The image obtained from each page described above has been described as an image based on the assumption of the use of a cartoon. However, this is not exhaustive and the image may be the one using a picture. For example, an image like a so-called panoramic picture may be a continuous image. In this case, the panoramic image may be segmented into a plurality of areas, and each area may be defined as one page.

What is claimed is:

1. An image data generation apparatus comprising:
    a display device;
    a touch sensor configured to output an operation signal corresponding to an operation from a user with respect to an image displayed on the display device;
    a memory configured to store a layout of a plurality of pages; and
    a processor configured to:
        cause the display device to display at least one page of the plurality of pages arranged in accordance with the layout stored in the memory;
        generate a plurality of interchanging operation images between a first page and a two or more other pages of the plurality of pages neighboring the first page;
        receive a user selection signal of the interchanging operation image from the touch sensor;
        change the layout stored in the memory so as to interchange the positions of the first page and a second page of the plurality of pages, with each other in response to the user selection signal, the second page being one of the two or more other pages neighboring the first page with at least one of the plurality of interchanging operation images being between the first page and the second page;
        obtain one image by arranging images on the plurality of pages in accordance with the changed layout; and
        connect the images to generate image data representing the one image.

2. The apparatus according to claim 1, wherein the processor changes the layout stored in the memory so as to display the second page at a position at which the first page has been displayed.

3. The apparatus according to claim 1, wherein the layout of the plurality of pages comprises a layout in which the pages are one-dimensionally arranged.

4. The apparatus according to claim 1, wherein the layout of the plurality of pages comprises a layout in which the pages are two-dimensionally arranged.

5. The apparatus according to claim 1, wherein
the processor causes the display device to display a deleting operation image for deleting the first page in a mode of specifying the first page.

6. The apparatus according to claim 1, wherein
the processor further generates image data representing an image on each of the plurality of pages.

7. The apparatus according to claim 1, wherein
the processor specifies an editing target page from pages displayed on the display device based on the operation signal and executes an editing process for the editing target page.

8. The apparatus according to claim 1, wherein
the processor executes an editing process of obtaining a template for defining an area in which an image represented by image data is configured to be arranged on the page and causing designated image data to be displayed inside the area, based on the operation signal.

* * * * *